United States Patent
Adams et al.

(10) Patent No.: US 7,121,523 B2
(45) Date of Patent: Oct. 17, 2006

(54) FLUID CONTROL VALVE

(75) Inventors: Kenneth Adams, Bloomington, IL (US); Wade Robel, Normal, IL (US); Frank Jianyuan Yang, Novi, MI (US)

(73) Assignee: Caterpillar Inc, Peoria, IL (US)

( * ) Notice: Subject to any disclaimer, the term of this patent is extended or adjusted under 35 U.S.C. 154(b) by 134 days.

(21) Appl. No.: 10/730,645

(22) Filed: Dec. 8, 2003

(65) Prior Publication Data

US 2005/0121637 A1  Jun. 9, 2005

(51) Int. Cl.
*F16K 31/02* (2006.01)

(52) U.S. Cl. ............ 251/119; 251/129.06; 251/129.16; 137/312

(58) Field of Classification Search ........... 251/129.15, 251/129.16, 119, 129.06, 129.07, 214; 137/312, 137/513.3
See application file for complete search history.

(56) References Cited

U.S. PATENT DOCUMENTS

| | | | | |
|---|---|---|---|---|
| 3,811,465 A | * | 5/1974 | Abbey | 137/487.5 |
| 4,320,779 A | * | 3/1982 | Peters | 137/492.5 |
| 4,579,145 A | * | 4/1986 | Leiber et al. | 137/625.65 |
| 5,090,661 A | * | 2/1992 | Parks et al. | 251/172 |
| 5,192,051 A | * | 3/1993 | Roberson | 251/328 |
| 5,375,576 A | | 12/1994 | Ausman et al. | |
| 5,478,045 A | | 12/1995 | Ausman et al. | |
| 6,279,539 B1 | | 8/2001 | Graves et al. | |
| 6,443,121 B1 | | 9/2002 | Carroll et al. | |

\* cited by examiner

*Primary Examiner*—Justine R. Yu
*Assistant Examiner*—Peter deVore
(74) *Attorney, Agent, or Firm*—Alan J. Hickman

(57) ABSTRACT

Particularly in an engine that has been inactive for a substantial period of time at a cold temperature, fluid forces acting on moving members, such as electronically-activated fluid control valves, may be significant until the engine warms up. A way to reduce the fluid forces and their detrimental effects is to reduce the volume of fluid which are creating the fluid forces, including venting all or some of this fluid to drain. Additionally, fluid that gathers can be drained away. In order to accomplish such venting, the present disclosure includes a fluid control valve having a body with at least one fluid passage connected to a bore, a movable member in the bore, an actuator connected to the movable member to move the movable member, and at least one vent passage opening into the bore between the fluid passage and the actuator. The disclosure may include additional drain passages to drain away gathered fluid from actuating components.

5 Claims, 4 Drawing Sheets

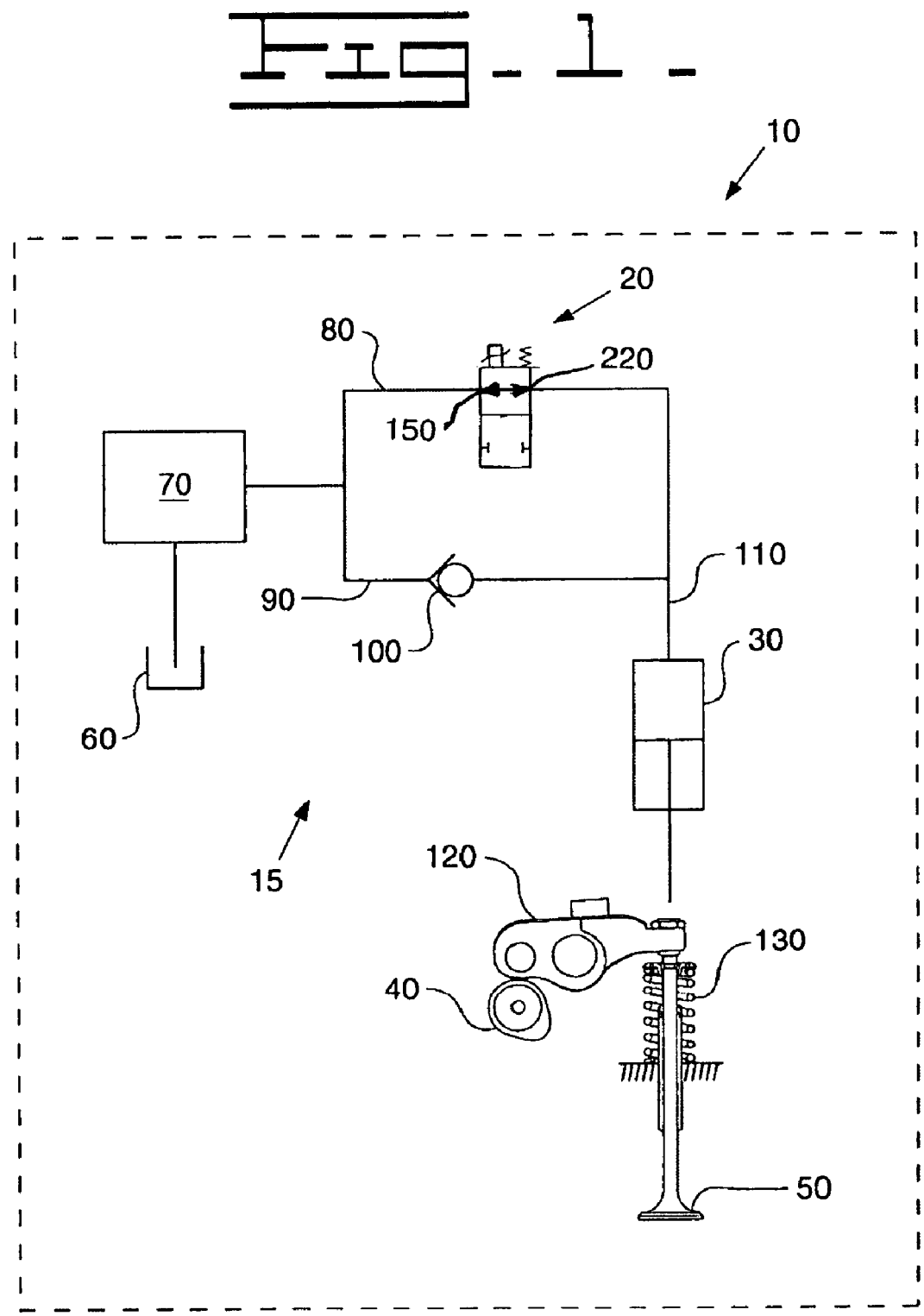
Fig-1-

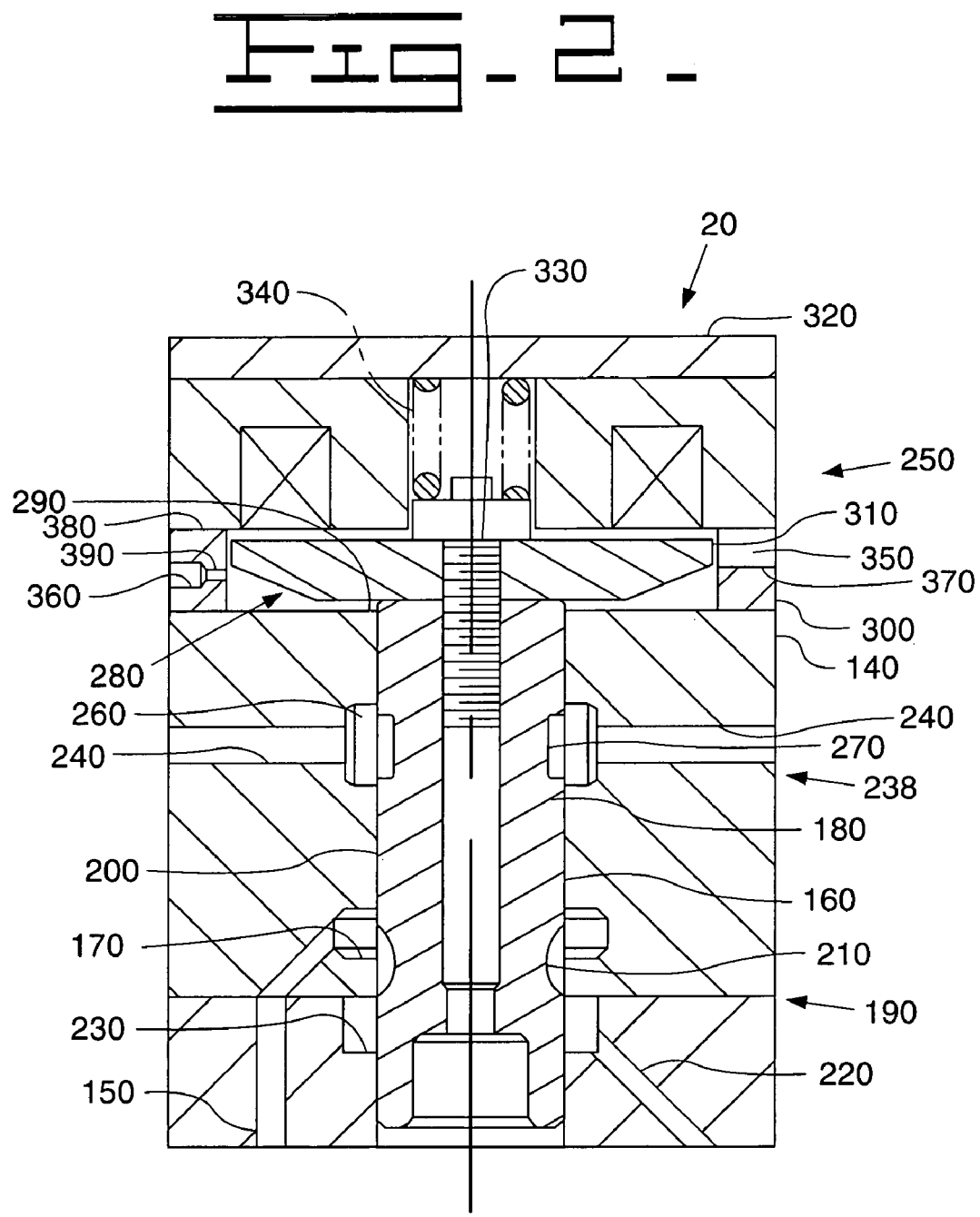

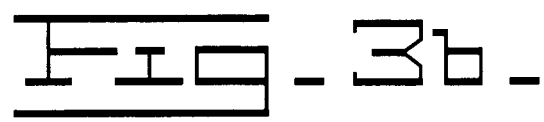
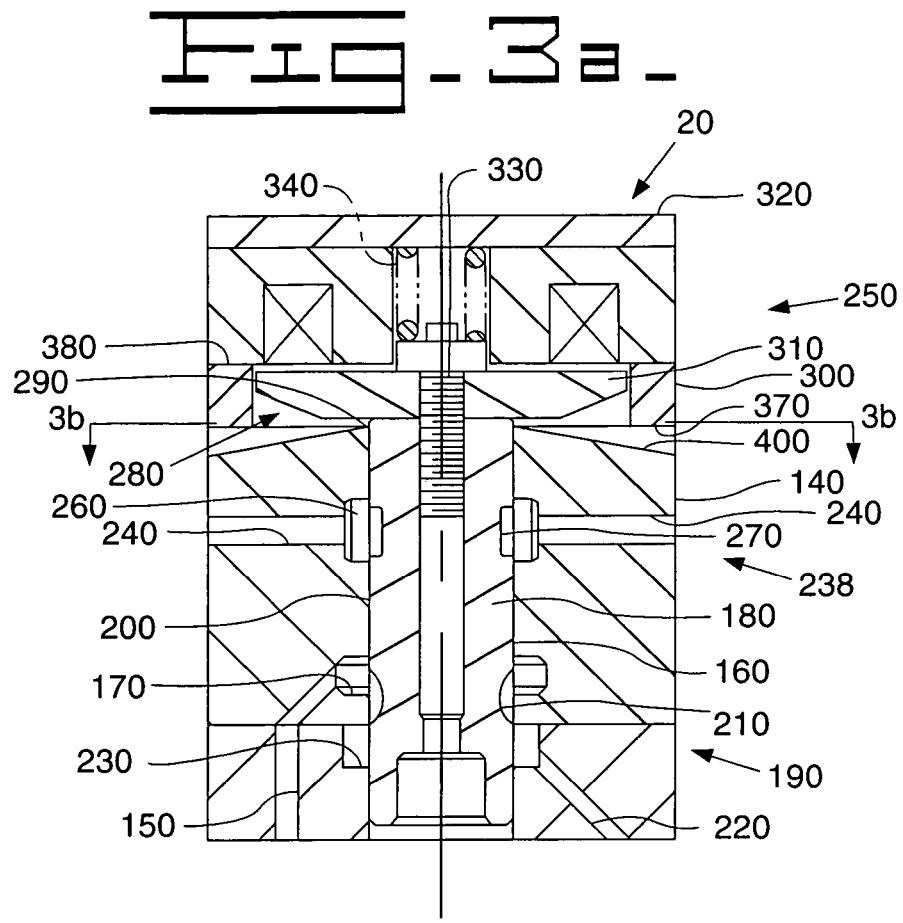
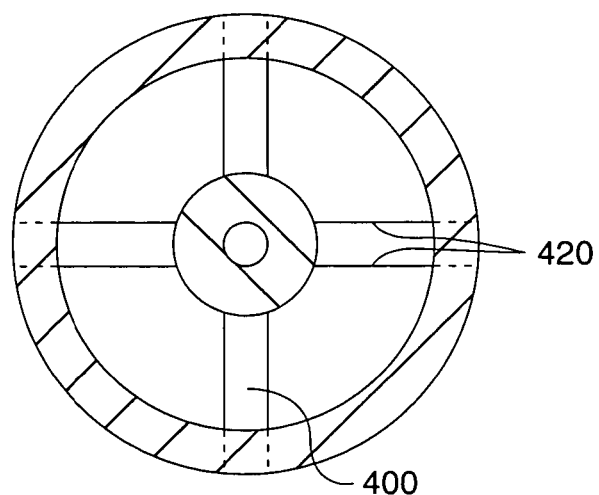

FLUID CONTROL VALVE

TECHNICAL FIELD

The present disclosure relates to a fluid control valve and more particularly an apparatus and method for reducing fluid forces acting on a fluid control valve.

BACKGROUND

Fluid control valves are well known in the art to provide on/off control of fluid flow, through the use of electrical control signals. Such fluid control valves may find use in internal combustion engines, in fuel systems, and/or in systems that control motion of the engine valves, such as a compression release braking system, or a system in which typical camshaft-produced valve events are modified by way of fluid action. In some cases such fluid control valves may be inactive for a substantial period of time at a cold temperature. These fluid control valves may be prone to slow opening and closing until such time that the fluid viscosity changes due to temperature change as the engine warms up, or the local fluid viscosity changes due to shearing effects of fluid as the fluid control valve is repeatedly operated, or a combination of these and/or other changes.

Such problems are believed to be caused by fluid collecting in undesired regions where it can fully or partially restrict motion of the moving members of the fluid control valve, or by fluid that finds its way into the clearance spaces that exist between stationary and movable members of the fluid control valves.

U.S. Pat. No. 5,478,045 discloses draining damping fluid with respect to one cavity of an actuator chamber of a fluid control valve, but is silent regarding fluid in other locations of the device.

The present disclosure is directed to overcoming one or more of the deficiencies as set forth above.

SUMMARY OF THE INVENTION

In one aspect of the present disclosure, a fluid control valve has a body with at least one fluid passage, an axial bore, a movable member disposed in the bore, an actuator operatively connected to the movable member and adapted to move the movable member in the axial bore, and the body has at least one vent passage opening into the axial bore at an axial location relative to the axial bore between the fluid passage and the actuator, and the vent passage is adapted to vent leakage fluid.

In another aspect of the present disclosure, a method of reducing fluid forces acting on a movable member movable relative to a body, consisting of moving the movable member in the body with an actuator, and venting leakage fluid from a location between the actuator and a fluid passage.

BRIEF DESCRIPTION OF THE DRAWINGS

FIG. 1. is a schematic view of an engine utilizing fluid control valve modification of valve events, FIG. 2. is a diagrammatic cross-sectional view through one embodiment of a fluid control valve, FIG. 3 and FIG. 3b. are a diagrammatic cross-sectional views through another embodiment of a fluid control valve, and FIG. 4. is a diagrammatic cross-sectional view through yet another embodiment of a fluid control valve.

DETAILED DESCRIPTION

Figure 4:
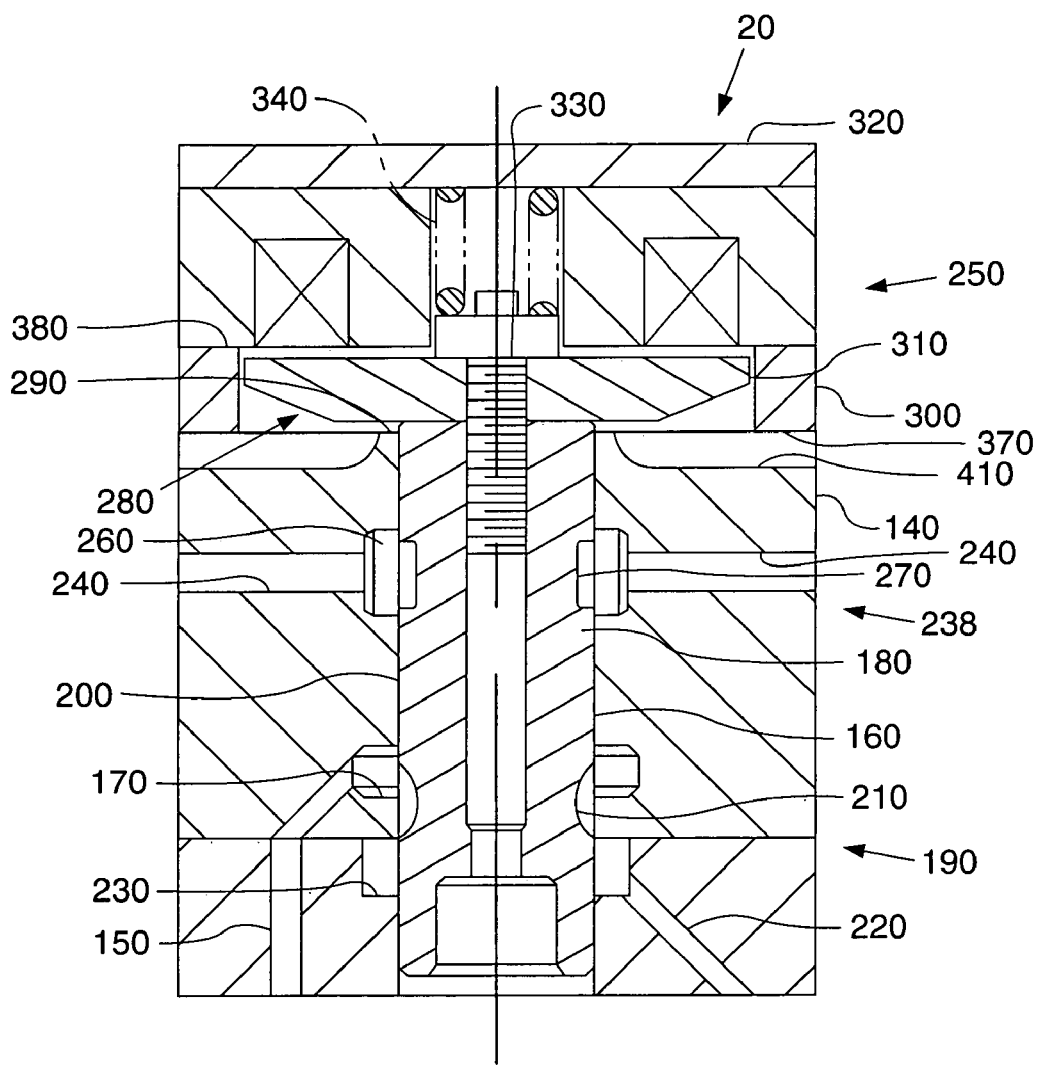

Referring to the drawings, FIG. 1 shows an internal combustion engine 10, having an engine valve 50 movable between closed and open positions relative to a valve seat (all not shown) by a rocker arm 120. The rocker arm 120 pivots about a center (not shown) in response to movement of a camshaft 40. Additional components not shown may make up the engine, such as push rods, camshaft followers, lash adjustment mechanism, cylinder head, and the like.

A valve position modification system 15 has a fluid control valve 20 and a fluidically driven actuator 30. The valve position modification system may control the opening and closing times of the engine valve 50.

The valve position modification system 15 further has a sump 60 connected to a fluid supply 70, which connects via a first conduit 80 to the fluid control valve 20 and via a second conduit 90 to a check valve 100. Both the fluid control valve 20 and the check valve 100 connect via a third conduit 110 to the fluidically driven actuator 30. The fluidically driven actuator 30 is movable to engage the rocker arm 120. The camshaft 40 is also engages with the rocker arm 120. The rocker arm 120 is engagable with the engine valve 50 or a valve bridge (not shown). A valve spring 130 may be positioned to bias the engine valve 50 into a closed position.

Referring now to FIG. 2, the fluid control valve 20 has a body 140 with a first fluid passage 150 that intersects an axial bore 160. A first annular portion 170 may be present in the body 140 or on a movable member 180, in fluid communication with first fluid passage 150. In the axial bore 160 is a movable member 180, which has a valve element portion 190 capable of permitting and blocking fluid flow. The movable member has an axis (not shown) along which linear or axial movement is permitted. A clearance 200 of predetermined magnitude exists between the axial bore 160 and the movable member 180. The valve element portion 190 may be configured to be either a 2-way or 3-way valve, as are well known in the art. Furthermore, valve element portion 190 may be a poppet-type valve or a spool-type valve, or a combination of these types, as are well known in the art. The embodiment of valve element portion 190 shown in FIG. 2 permits flow in a first position, and blocks flow in a second position. In the first position, a groove 210 disposed on the movable member 180 is operatively positioned to provide fluid communication between the first fluid passage 150 and a second fluid passage 220. In the second position, the groove 210 disposed on movable member 180 is operatively positioned to block fluid communication between the first fluid passage 150 and the second fluid passage 220.

The second fluid passage 220 intersects the axial bore 160. A second annular portion 230 may be present in the body 140 or on the movable member 180, in fluid communication with the second fluid passage 220.

The fluid control valve includes a means 238 for reducing fluid forces in a fluid control valve. The means may include a vent passage 240, which passes through the body 140 and opens into the axial bore 160 at an axial location relative to the axial bore 160 between the first fluid passage 150 and an actuator 250. The vent passage 240 is adapted to vent leakage fluid and reduce fluid forces acting on the movable member 180. The vent passage 240 may communicate with the axial bore 160 at a third annular portion 260, which may be contained in the body 140, or a fourth annular portion 270 contained in the movable member 180, or both. The vent passage 240 may be a singular vent passage, or may be a plurality of vent passages.

An actuator cavity 280 of the fluid control valve 20 adjoins a body end face 290. The actuator cavity 280 is partially formed by a spacer 300 which adjoins a portion of the body end face 290, and the actuator 250 which adjoins the spacer 300. Inside the actuator cavity 280 may be an armature 310, which is connected to movable member 180, or which may be formed as an integral portion of movable member 180. The actuator 250 is operatively connected to the movable member 180 and is adapted to move the movable member 180 in the axial bore 160 to the second position. The actuator 250 may be of either an electromagnetic device or piezo-electric device, as both types are well known in the art. A cap 320 may adjoin the actuator 250. The cap 320 may be integrally formed with the actuator. A fastener 330 may secure the armature 310 to the movable member 180. A spring 340 may engage the cap 320 and the fastener 330, to bias the fastener 330, the armature 310, and the movable member 180 to the first position. Other arrangements are possible in which the spring 340 engages the armature 310 or the movable member 180, rather than engages the fastener 330.

The actuator cavity 280 may be drained of fluid through a slot 350 or a passage 360. The spacer 300 surrounds the armature 310, and may have one or more slots 350, in either a first face 370 of the spacer 300 nearer to the body end face 290 or a second face 380 nearer to the actuator 250, or may have one or more passages 360 passing through the spacer 300. The passage 360 may be formed by a variety of known methods such as drilling, forming, stamping, electrical discharge machining, laser drilling, or other methods and may optionally include an orifice 390 of smaller diameter or area than the passage 360.

Now referring to FIG. 3a, the means 238 for reducing fluid forces may also include an inclined drain passage 400 formed in the body 140 at the body end face 290 adjoining the actuator 250. The inclined drain passage 400 may be arranged substantially radially relative to a centerline of axial bore 160. As seen in FIG. 4 in another embodiment, the means 238 for reducing fluid forces may also include the parallel drain passage 410 arranged substantially parallel with respect to the body end face 290. Each fluid control valve 20 may include a plurality of inclined drain passages 400, a plurality of parallel drain passages 410, or a combination of single or plural inclined drain passages 400 and single or plural parallel drain passages 410.

Now referring to FIG. 3b, the inclined drain passage 400, and/or parallel drain passage 410 may be arranged to have passage walls 420 that are substantial parallel, or substantial divergent, or may be a combination of passages 400, 410 having at least one drain passage 400, 410 with passage walls 420 that are substantially parallel and at least one drain passage 400, 410 having passage walls 420 substantially divergent. Substantially parallel walls 420 may be advantageous for high volume manufacturing, however, in some cases substantially divergent walls 420 may better drain the actuator cavity 280 than parallel walls 420.

INDUSTRIAL APPLICABILITY

In operation and with reference to FIGS. 1. and 2., fluid from the sump 60 is delivered by the fluid supply 70 thorough the conduit 80 and the fluid control valve 20 and through the conduit 90 and the check valve 100 to the conduit 110, where fluid is delivered to the fluidically driven actuator 30. The camshaft 40 rotates to move the rocker arm 120 and open the engine valve 50 in a well-known manner. The fluidically driven actuator 30 moves to follow the motion of the rocker arm 120, and may or may not remain engaged with the rocker arm 120. A first signal is delivered to the fluid control valve 20, which moves the movable member 180 to the second position, thereby blocking fluid flow through the fluid control valve 20. As the camshaft 40 continues to rotate, the rocker arm 120 and the valve 50 begins to return to the closed position, until the rocker arm 120 engages the fluidically driven actuator 20, which then holds the engine valve 50 in a partially-open position, as fluid flow from the fluidically driven actuator 30 is blocked. A second signal is delivered to the fluid control valve 20, which moves the movable member 180 to the first position, thereby permitting fluid flow through the fluid control valve 20, and fluid flow from the fluidically driven actuator 30. The fluidically driven actuator 30 moves to permit the rocker arm 120 to move so that engine valve 50 can close. The first signal and the second signal could be analog or digital signals and could be the presence of a signal or the absence of a signal.

In particular, when the second signal is delivered, the actuator 250 is de-energized, and spring 340 holds the movable member 180 in the first position to permit fluid to flow between the first fluid passage 150 and the second fluid passage 220. At the first position, fluid flows from the fluidically driven actuator 30 and no modification of the valve events occurs. The valve spring 130 pushes fluid out of the fluidically driven actuator 30, through the fluid control valve 20, into the fluid supply 70.

When the first signal is delivered, the actuator 250 is energized, and the force of spring 340 is overcome, and the movable member 180 responsively moves linearly or axially along its axis to the second position to block fluid flow between the first fluid passage 150 and the second fluid passage 220. At the second position, the valve element portion 190 blocks flow of fluid from the fluidically driven actuator 30 and a modification of the valve closing timing occurs.

To improve the operation of the flow control valve 20 when fluid travels along the clearance 200 between the axial bore 160 and the movable member 180, venting of fluid to the outside of the fluid control valve 20 occurs, through the vent passage 240, before fluid reaches the actuator cavity 280. Such venting reduces the amount of fluid present in the clearance 200 that can slow the opening or closing of the movable member 180. Communication of fluid from the clearance 200 to the vent passage 240 may be enhanced by the presence of a first annular portion 170 on body 140 or a second annular portion 230 on movable member 180, which collects fluid from the entire clearance 200 around the movable member 180, rather than only at the intersection of the vent passage 240 and the axial bore 160.

In the event that fluid does reach the actuator cavity 280, the slot 350 or the passage 360 and the one or more drain passages 400, 410 reduce the amount of fluid collected in the actuator cavity 280 that may slow the opening or closing of the movable member 180. Operation of the fluid control valve 20 under hot conditions for a period of time is more likely to cause low viscosity fluid to reach the actuator cavity 280, that drains out through the aforementioned slots 350 and/or passages 360, rather than collecting, as collected fluid has a tendency to slow the opening or closing of the movable member 180. Should collected fluid in actuator cavity 280 or fluid in the clearance 200 cool to a lower temperature during shutdown of the engine 10 for a period of time, the fluid becomes more viscous, requiring larger forces to move the movable member 180 when the operation of the engine 10 is resumed for a later period of time.

In operation, this disclosure provides a method of reducing the effect of fluid forces acting on a movable member 180 movable relative to a body 140. The movable member 180 in the body 140 is periodically moved linearly or axially by an actuator 250, and a continuous venting of leakage fluid occurs from a location in the body 140 between the actuator 250 and a fluid passage 150. This venting reduces the effect of fluid forces that may be present. Operation is also enhanced when a change in operating temperature occurs, such as when the engine 10 and valve position modification system 15 has been operated repeatedly to move a movable member 180 when fluid is at a first temperature, then stopping operation of the engine 10 and valve position modification system 15, which discontinues moving of movable member 180, until a later time when fluid is at a second temperature is less than first temperature. By venting some fluid during warm operation, a lesser amount of fluid remains which can restrict motion of the movable member during cooler operation, when the detrimental effect of the fluid is increased due to an increase in fluid viscosity at lower temperatures. Furthermore, the efficiency of collection of fluid increases when venting leakage fluid includes an annular portion 260,270 as the fluid is collected from the entire circumference of the movable member 180. Fluid reaching the actuator cavity 280 is drained near an end face through one or more drain passages 400, 410.

It should be understood that the above description is intended for illustrative purposes only, and is not intended to limit the scope of the present disclosure in any way. Those skilled in the art will appreciate that other aspects, and features of the present disclosure can be obtained from a study of the drawings, the disclosure, and the appended claims.

What is claimed is:

1. A method of reducing fluid forces acting on a movable member of a fluid control valve, said movable member being movably disposed in a bore disposed in a body of the fluid control valve and movable in the bore relative to a body of the fluid control valve, the method comprising:
    moving the movable member in the body with an actuator;
    venting leakage fluid from the bore at a location between the actuator and a fluid passage;
    moving the movable member when the fluid is at a first temperature;
    discontinuing moving said movable member; and
    moving said movable member when fluid is at a second temperature, and said second temperature is less than said first temperature.

2. The method of claim 1 includes venting said leakage fluid through an annular portion.

3. The method of claim 1 wherein said actuator is an electromagnetic device.

4. The method of claim 1 wherein said actuator is a piezoelectric device.

5. The method of claim 1 including draining fluid near an end face through a drain passage.

* * * * *